US012675231B2

(12) United States Patent
Chiang et al.

(10) Patent No.: US 12,675,231 B2
(45) Date of Patent: Jul. 7, 2026

(54) STORAGE SYSTEM AND DATA DE-DUPLICATION METHOD USING IN-MEMORY SEARCH DEVICE

(71) Applicant: MACRONIX INTERNATIONAL CO., LTD., Hsinchu (TW)

(72) Inventors: Kun-Chi Chiang, Zhubei City (TW); Yung-Chun Li, New Taipei City (TW); Chun-Lien Su, Taichung City (TW); Han-Wen Hu, Tainan City (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 54 days.

(21) Appl. No.: 18/792,045

(22) Filed: Aug. 1, 2024

(65) Prior Publication Data

US 2026/0037171 A1 Feb. 5, 2026

(51) Int. Cl.
*G06F 3/06* (2006.01)

(52) U.S. Cl.
CPC .......... *G06F 3/0641* (2013.01); *G06F 3/0604* (2013.01); *G06F 3/0679* (2013.01)

(58) Field of Classification Search
CPC ..... G06F 3/0641; G06F 3/0604; G06F 3/0679
See application file for complete search history.

(56) References Cited

U.S. PATENT DOCUMENTS

| | | | |
|---|---|---|---|
| 6,829,195 B2 | 12/2004 | Uchida | |
| 2004/0255090 A1* | 12/2004 | Guterman | G11C 16/349 |
| | | | 711/156 |
| 2013/0308393 A1 | 11/2013 | Youn | |
| 2019/0206460 A1 | 7/2019 | O | |
| 2020/0211655 A1* | 7/2020 | Shibata | H10B 43/27 |
| 2021/0271650 A1* | 9/2021 | Wang | G06F 16/174 |
| 2024/0143213 A1* | 5/2024 | Mayo | G06F 3/0641 |

FOREIGN PATENT DOCUMENTS

TW 202243087 A 10/2022

* cited by examiner

*Primary Examiner* — Nicholas A. Paperno
(74) *Attorney, Agent, or Firm* — McClure, Qualey & Rodack, LLP

(57) ABSTRACT

A storage system and method utilize an in-memory search (IMS) memory device to improve data storage efficiency. A data controller generates a feature, such as a hash value, corresponding to user data temporarily stored in a random access memory. This feature is transmitted to the IMS memory device, which stores a plurality of characteristic values comprising data features and physical block addresses of data already written in a storage device. The IMS memory device compares the received feature with the stored characteristic values. Based on the comparison result provided by the IMS memory device, the data controller determines whether the user data is a duplicate and decides whether to write the user data into the storage device, thereby optimizing storage space usage and reducing data swapping.

14 Claims, 9 Drawing Sheets

200

220

220

220

220

STORAGE SYSTEM AND DATA DE-DUPLICATION METHOD USING IN-MEMORY SEARCH DEVICE

TECHNICAL FIELD

The disclosure relates in general to a storage system and a data storage method.

BACKGROUND

In computing systems, data de-duplication is a feature that can help reduce the impact of redundant data on storage costs. When data de-duplication is enabled, data de-duplication compares to determine whether the current stored data is the same with to-be-written data. If the current stored data is the same with to-be-written data, the duplicated to-be-written data is not written to optimize the storage space.

FIG. 1 shows a prior data de-duplication implementation. As shown in FIG. 1, there is 12 to-be-written data. After data de-duplication, there is 4 to-be-written data.

By now, in performing data de-duplication, the hash value of each of the to-be-written data is generated and stored in a hash table. But when non-duplicated data is growing, the size of the hash table is also increased and thus the storage space has low usage efficiency.

Further, the conventional data de-duplication has an issue of data swap. Data swap refers that the hash values are swapped between the storage space and the memory. More data swapping lowers the data de-duplication efficiency.

Thus, there needs a storage system and a data storage method, wherein in performing data de-duplication, the storage space usage efficiency is improved, data swapping is lowered to improve the data de-duplication efficiency.

SUMMARY

According to one embodiment, a memory device coupled to a data controller is provided. The memory device includes: a memory controller; a driving circuit coupled to the memory controller; and a memory array coupled to the memory controller, the memory array including a plurality of memory cells. In response to a first user data feature of a user data generated by the data controller, the memory controller compares the first user data feature with a plurality of second user data features from a plurality of characteristic values stored in the memory cells to generate a comparison result, the plurality of characteristic values including the plurality of second user data features and a plurality of physical block addresses corresponding to data stored in a storage device; the memory controller sends the comparison result to the data controller; and based on the comparison result, the data controller determines whether to write the user data into the storage device.

According to another embodiment, a data storage method is provided. The data storage method includes: generating a first user data feature of a user data stored in a random access memory by a data controller; sending the first user data feature of the user data by the data controller to an IMS memory device; comparing the first user data feature with a plurality of second user data features from a plurality of characteristic values stored in the IMS memory device to generate a comparison result, the plurality of characteristic values including the plurality of second user data features and a plurality of physical block addresses corresponding to data stored in a storage device; sending the comparison result to the data controller by the IMS memory device; and based on the comparison result, determining whether to write the user data into the storage device by the data controller.

Figure 1:
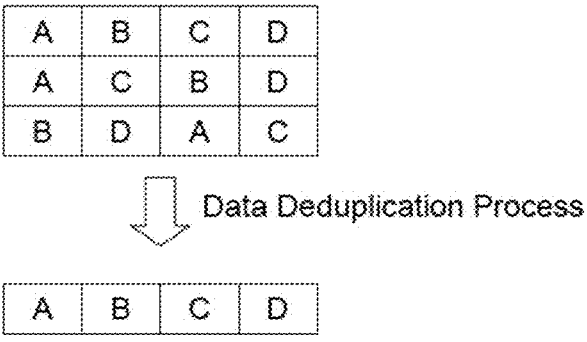
FIG. 1 shows a prior data de-duplication implementation.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 2:
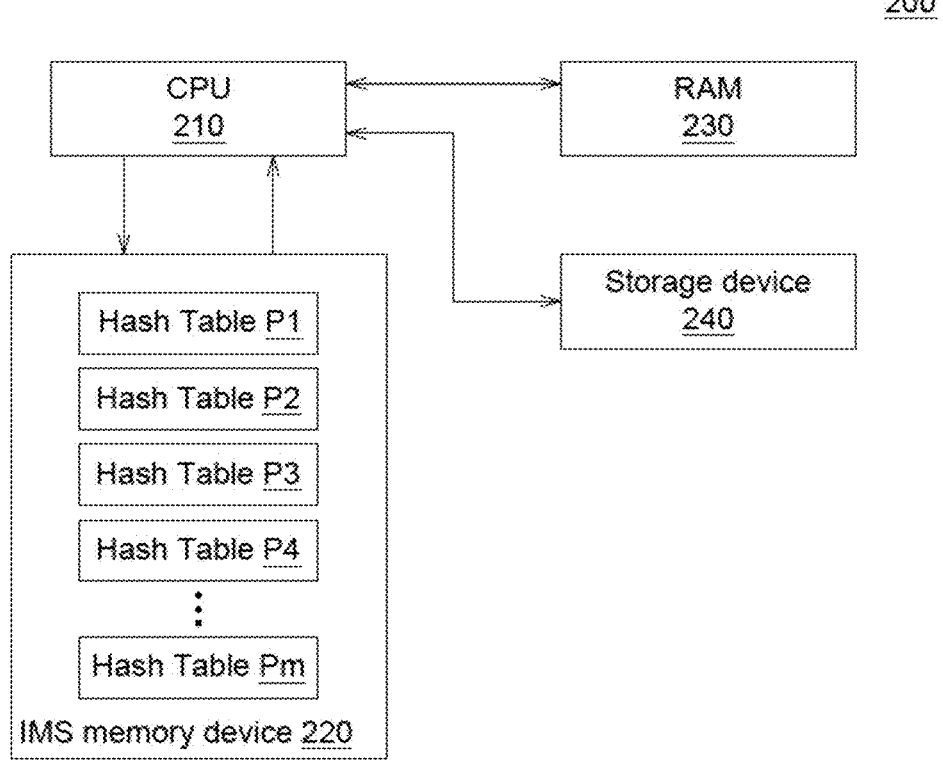
FIG. 2 shows a functional block diagram of a storage system according to one embodiment of the application.

FIG. 2 shows a functional block diagram of a storage system according to one embodiment of the application. The storage system 200 according to one embodiment of the application includes a CPU (central processing unit) 210, an in-memory search (IMS) memory device 220, a random access memory (RAM) 230 and a storage device 240. The CPU 210 is also referred as a data controller. The RAM 230 may be a dynamic random access memory (DRAM) or a static random access memory (SRAM). The random access memory (RAM) 230 is a volatile memory and the storage device 240 is a non-volatile storage device. The IMS memory device 220 is also referred as an IMS chip. The IMS memory device 220 is for example but not limited by, charge-trapping based memory devices (for example but not limited by Silicon-Oxide-Nitride-Oxide-Silicon (SONOS)) or floating-gate based memory devices.

The storage system 200 is for example but not limited by storage application devices (Solid-state drive (SSD) and so on), embedded systems for storage (for example smart phones, edge computing devices and so on), or distributed storage systems.

The CPU 210 is coupled to the IMS memory device 220, the random access memory 230 and the storage device 240. Detailed operations of the CPU 210, the IMS memory device 220, the random access memory 230 and the storage device 240 are described in below. In FIG. 2, the IMS memory device 220 and the storage device 240 are separated, but in other possible embodiments of the application, the IMS memory device 220 and the storage device 240 are integrated in the same device, which is still within the spirit and the scope of the application. The IMS memory device 220 includes a plurality of IMS memory cells, wherein the IMS memory cells are for example but not limited by, content addressable memory (CAM) cells. The IMS memory device 220 stores a plurality of hash tables P1~Pm (m being a positive integer). The structure of the storage system in FIG. 2 is also applicable to a computer system. In some embodiments of the present disclosure, the storage device 240 can be a NAND storage device. In general, when a data is programmed or written in the storage device 240, a mapping table will be generated comprising a corresponding mapping information about a logical block address of the data to a physical block address of the data indicating the actual location of which the data is stored in the storage device 240. In a NAND flash memory, such mapping table can be stored in the storage device 240 and an FTL (Flash Translation Layer) can use this mapping information to access target data stored in the flash memory by changing logical address from the file system to physical address in the flash memory.

Figure 3A:
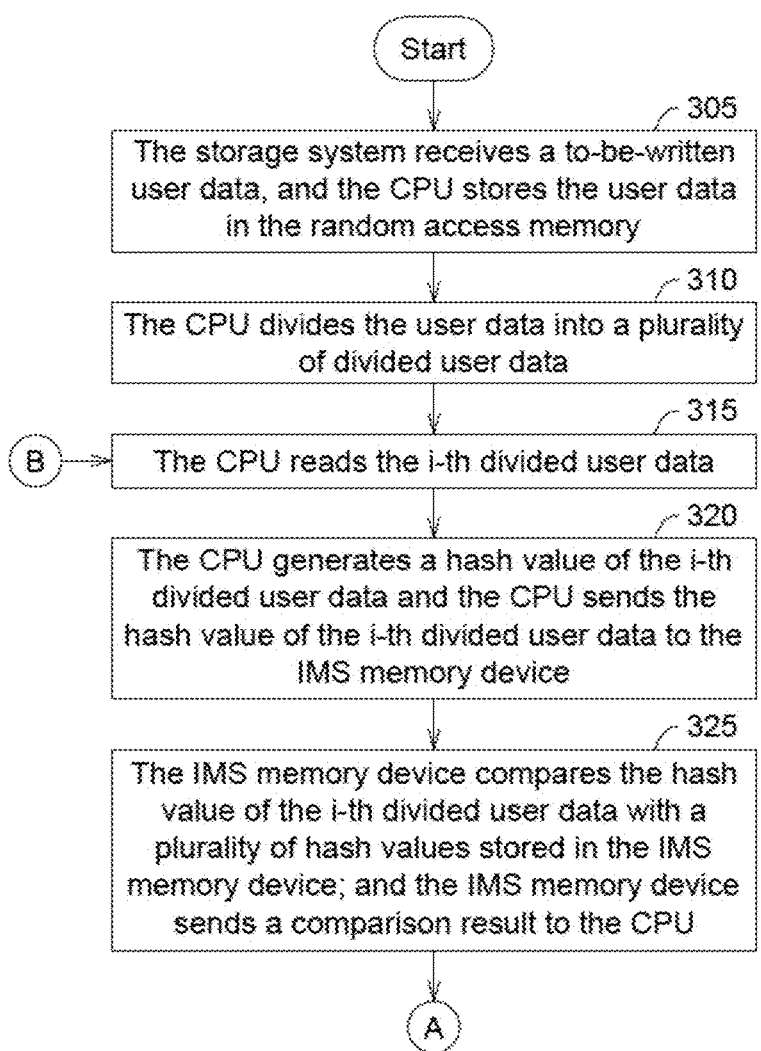
FIG. 3A and FIG. 3B show a data storage method according to one embodiment of the application.
Figure 3B:
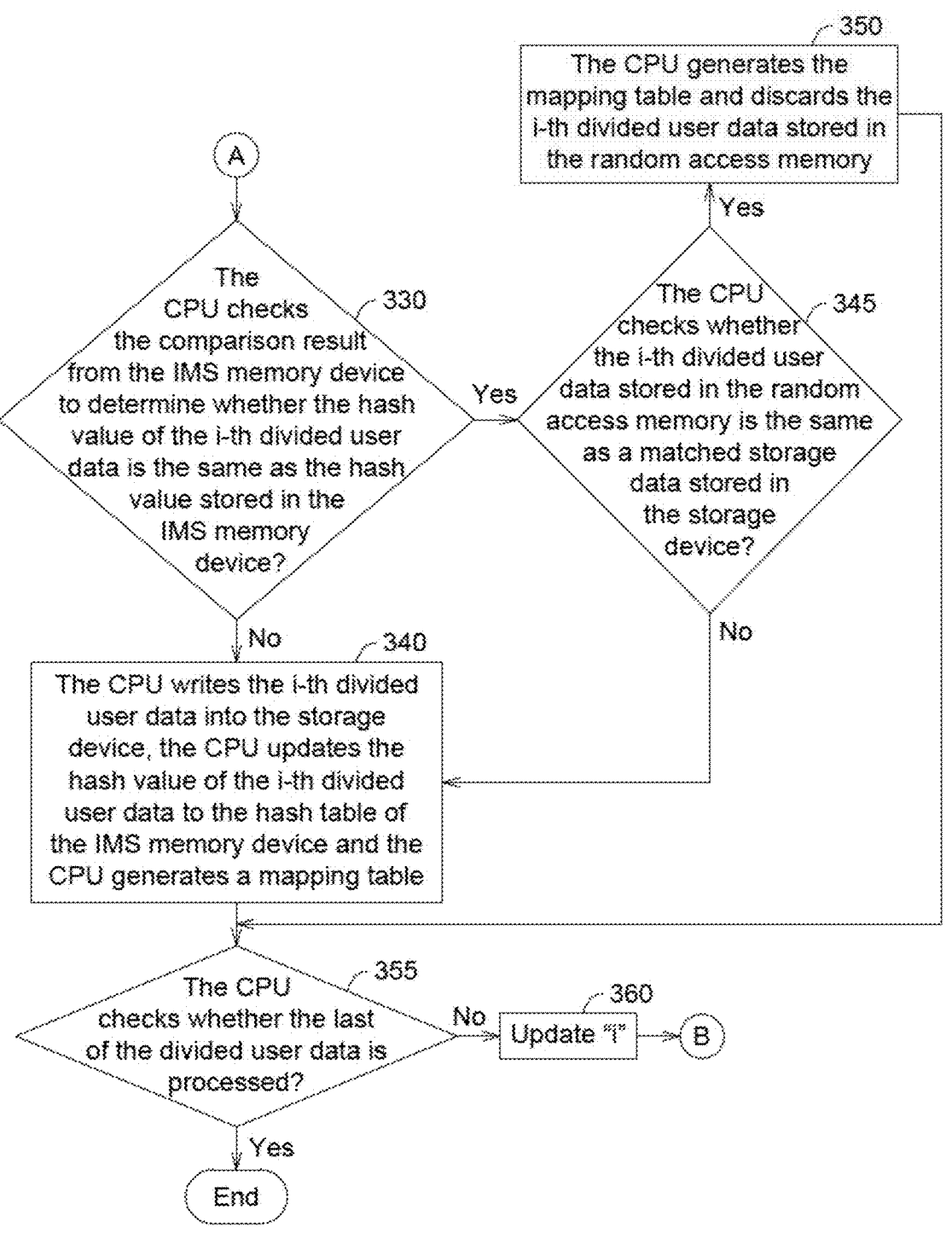

FIG. 3A and FIG. 3B show a data storage method according to one embodiment of the application. In step 305, the storage system receives a to-be-written user data, and the CPU 210 stores the user data in the random access memory 230. In step 310, the CPU 210 divides the user data into a plurality of divided user data, for example but not limited by, the divided user data is 4K or 8K (bits).

In step 315, the CPU 210 reads the i-th divided user data (i being a positive integer).

In step 320, the CPU 210 generates a hash value (also referred as a divided user data feature) of the i-th divided user data and the CPU 210 sends the hash value of the i-th divided user data to the IMS memory device 220. In the application, the hash value is also referred as a fingerprint value. In one possible example, the hash value of a 4K-bit divided user data has a hash value of 128 bits or 256 bits. The application is not limited by how to generate the hash values.

In step 325, the IMS memory device 220 compares the hash value of the i-th divided user data with a plurality of hash values of the storage data stored in the IMS memory device 220; and the IMS memory device 220 sends a comparison result to the CPU 210. The plurality of hash values stored in the IMS memory device 220 are for example but not limited by, stored in a plurality of hash tables (the hash tables P1~Pm in FIG. 2). The plurality of hash values stored in the IMS memory device 220 are corresponding to a plurality of storage data stored in the storage device 240. That is, the plurality of hash values stored in the IMS memory device 220 are hash values of the plurality of storage data stored in the storage device 240.

In step 330, the CPU 210 checks the comparison result from the IMS memory device 220 to determine whether the hash value of the i-th divided user data is the same as the hash value stored in the IMS memory device 220. When the step 330 is false (the hash value of the i-th divided user data is not the same as the hash value stored in the IMS memory device 220), in step 340, the CPU 210 writes the i-th divided user data into the storage device 240, the CPU 210 updates the hash value of the i-th divided user data to the hash table of the IMS memory device 220 and the CPU 210 generates a mapping table for the i-th divided user data. The mapping table maps a relationship between a logical block address of the i-th divided user data with a write address (also referred as a physical block address (PBA)) of the i-th divided data stored in the storage device 240.

When the step 330 is yes (the hash value of the i-th divided user data is the same as the hash value stored in the IMS memory device 220), the flow proceeds to step 345. In step 345, the CPU 210 checks whether the i-th divided user data stored in the random access memory 230 is the same as a matched storage data stored in the storage device 240, wherein the matched storage data refers to that the hash value of the matched storage data is the same as the hash value of the i-th divided user data. The purpose of step 345 is that before discarding the i-th divided user data, the CPU 210 checks again whether the i-th divided user data is the same as the matched storage data of the storage device 240 to prevent error discarding data because of the possibility of hash collision.

When the step 345 is false (the i-th divided user data stored in the random access memory 230 is not the same as the matched storage data stored in the storage device 240), the flow proceeds to the step 340. After step 340, the flow proceeds to step 355. In one embodiment of the application, the storage data of the storage device 240 is one-to-one to the hash values of the IMS memory device 220. In other words, when the storage data is written into the storage device 240, the hash value of the storage data is stored in the IMS memory device 220.

When the step 345 is yes (the i-th divided user data stored in the random access memory 230 is the same as the matched storage data stored in the storage device 240), the flow proceeds to step 350. In step 350, the CPU 210 generates the mapping table and discards the i-th divided user data stored in the random access memory 230. That is, i-th divided user data stored is not written into the storage device 240. By so, data de-duplication is achieved. In step 350, the CPU 210 also generates a mapping table for the i-th divided user data, the mapping table maps a relationship between a logical block address of the i-th divided user data with the write address of the matched storage data stored in the storage device 240. After step 350, the flow proceeds to step 355.

In step 355, the CPU 210 checks whether the last of the divided user data is processed. When step 355 is false, "i" is updated (step 360), and the flow proceeds to the step 315 to process the next divided user data. When the step 355 is yes, the flow ends.

Figure 4A:
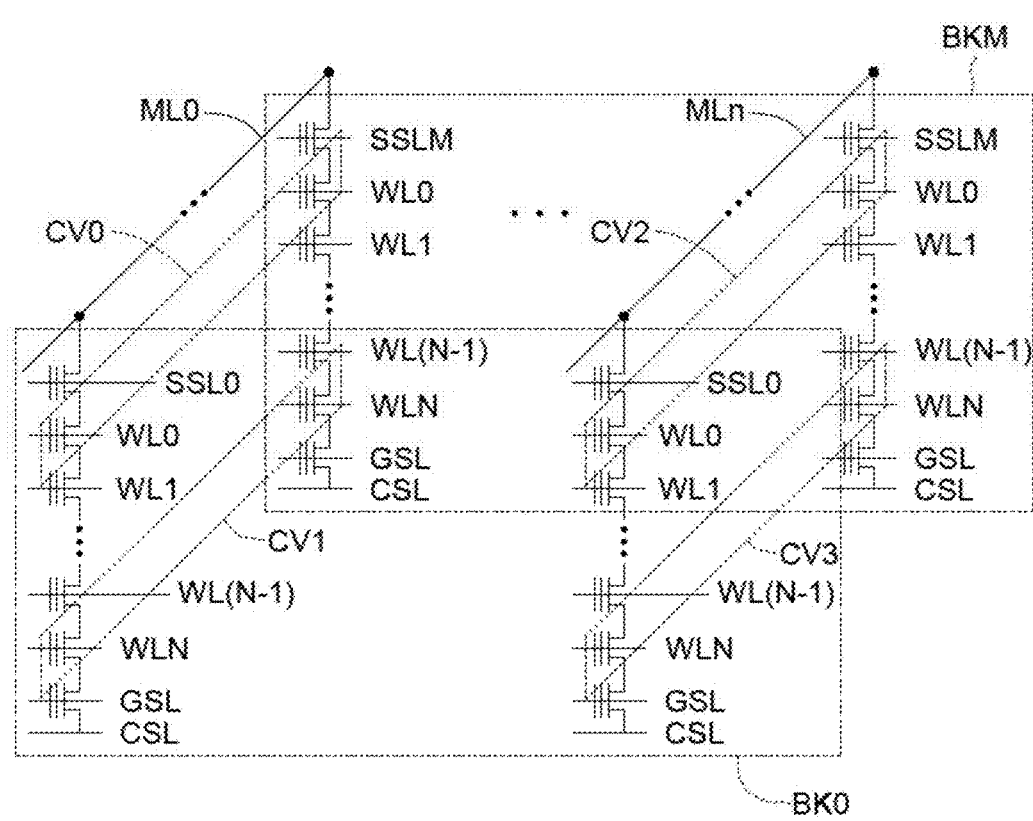
FIG. 4A to FIG. 4C show several examples in storing the hash values into the IMS memory device.
Figure 4B:
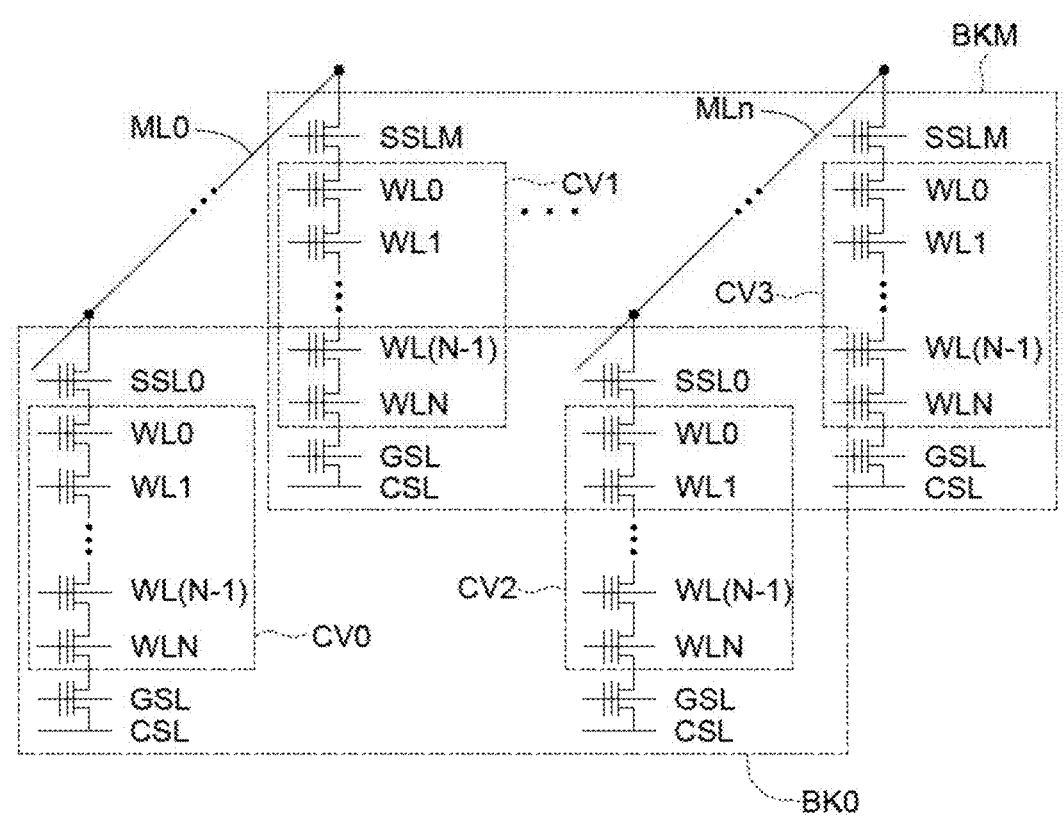
Figure 4C:
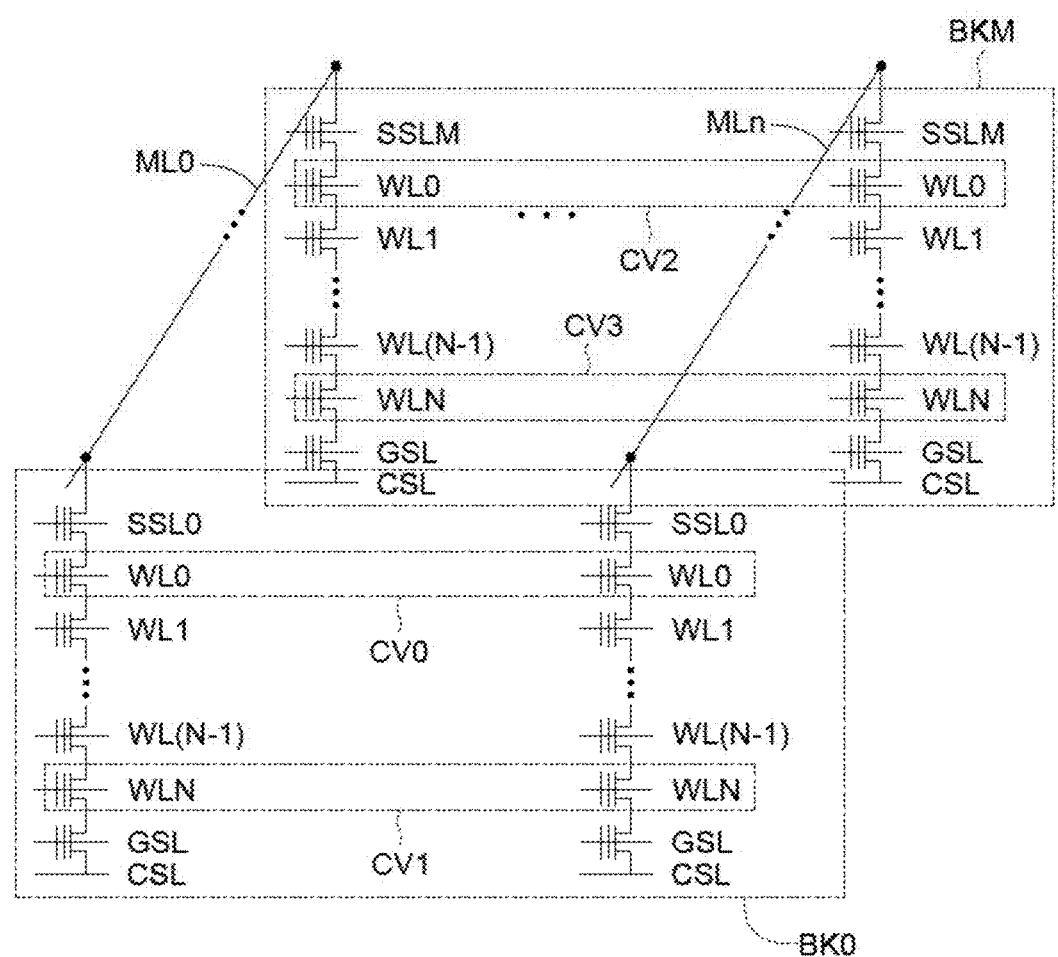

FIG. 4A to FIG. 4C show several examples in storing the characteristic values into the IMS memory device 220. The IMS memory device 220 includes a plurality of match lines ML0-MLn, a plurality of string select lines SSL0~SSLM (M being a positive integer), a plurality of word lines WL0~WLN (N being a positive integer), a global source line GSL and a common source line CSL. In FIG. 4A to FIG. 4C, the IMS memory device 220 includes a plurality of blocks BK0~BKM. The word lines WL0~WLN and the IMS memory cells form the blocks BK0~BKM. Although FIG. 4A to FIG. 4C show a three-dimensional memory device, but the application is not limited by this. The application is also applicable to a two-dimension memory device, which is still within the spirit and the scope of the application.

In FIG. 4A, the characteristic values CV0, CV1, CV2, CV3, . . . are stored in the IMS memory cells of the IMS memory device 220, wherein the same characteristic value is stored in the same word line, different select string lines (SSL) and different blocks BK0~BKM. The characteristic value includes a physical block address and a hash value (or said fingerprint or user data feature).

In FIG. 4B, the characteristic values CV0, CV1, CV2, CV3, . . . are stored in the IMS memory cells of the IMS memory device 220, wherein the same characteristic value is stored in the different word lines, the same select string line and the same block.

In FIG. 4C, the characteristic values CV0, CV1, CV2, CV3, . . . are stored in the IMS memory cells of the IMS memory device 220, wherein the same characteristic value is stored in the same word line, the same select string line and the same block.

By FIG. 4A and FIG. 4C and the data storage method of one embodiment of the application, the storage system in one embodiment of the application may have high band-width in comparing the hash values and thus data storage efficiency is also improved.

In one embodiment of the application, each bit of the characteristic value stored in the IMS memory cells may be paired (or expanded) by a duplicated bit or an inverse bit according to different expanding methods. Thus, if the characteristic value has 128 bits, after expanding, the expanded characteristic value has 128*2=256 bits. The expanding methods are applicable to FIG. 4A to FIG. 4C of the application.

Figure 5A:
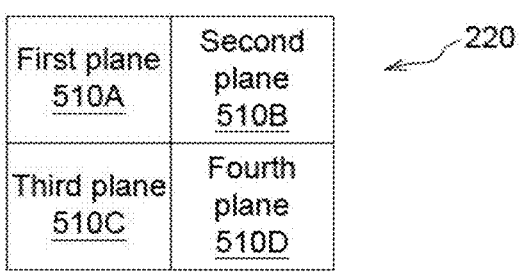
FIG. 5A to FIG. 5C show several mapping table storage implementations according to one embodiment of the application.
Figure 5B:
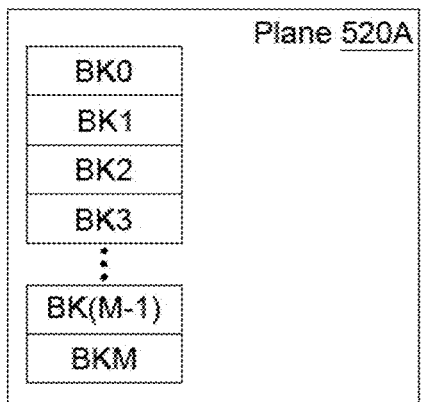
Figure 5C:
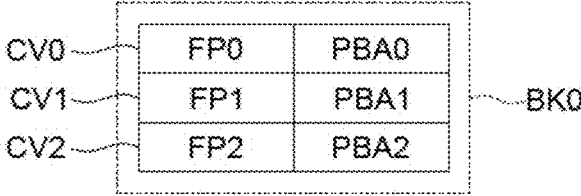

FIG. 5A to 5C illustrate the storage method of the characteristic values (for example the characteristic values CV0, CV1, CV2, CV3 in FIG. 4A-FIG. 4C) according to an embodiment of the present application. In FIG. 5A, the IMS memory device 220 includes several planes 510A-510D, and each plane 510A-510D includes a plurality of memory cells. For example but not limited to, the memory cells included in the first plane 510A and the third plane 510C are used for storing the hash values, while the memory cells included in the second plane 510B and the fourth plane 510D are used as IMS memory cells to store physical block addresses. That is, in FIG. 5A, the characteristic value (for example the characteristic values CV0, CV1, CV2, CV3 in FIG. 4A-FIG. 4C) is stored in different planes.

In FIG. 5B, the IMS memory device 220 includes several planes, in which at least one plane 520A includes several blocks BK0~BKM, where, for example but not limited to, a part of the blocks (such as BK1, BK3, etc.) in the plane 520A are used for storing the hash values, and another part of the blocks (such as BK0, BK2, etc.) are used as IMS memory cells to store the physical block addresses. That is, in FIG. 5B, the characteristic value (for example the char-acteristic values CV0, CV1, CV2, CV3 in FIG. 4A-FIG. 4C) is stored in different blocks within the same plane.

In FIG. 5C, the same block (such as BK0) can be used to store multiple hash values (FP0, FP1, FP2, etc.) and multiple physical block addresses (PBA0, PBA1, PBA2, etc.). That is, in FIG. 5C, the characteristic values (for example the characteristic value CV0 in FIG. 4C) are stored in the same word line in the same block within the same plane.

Figure 6:
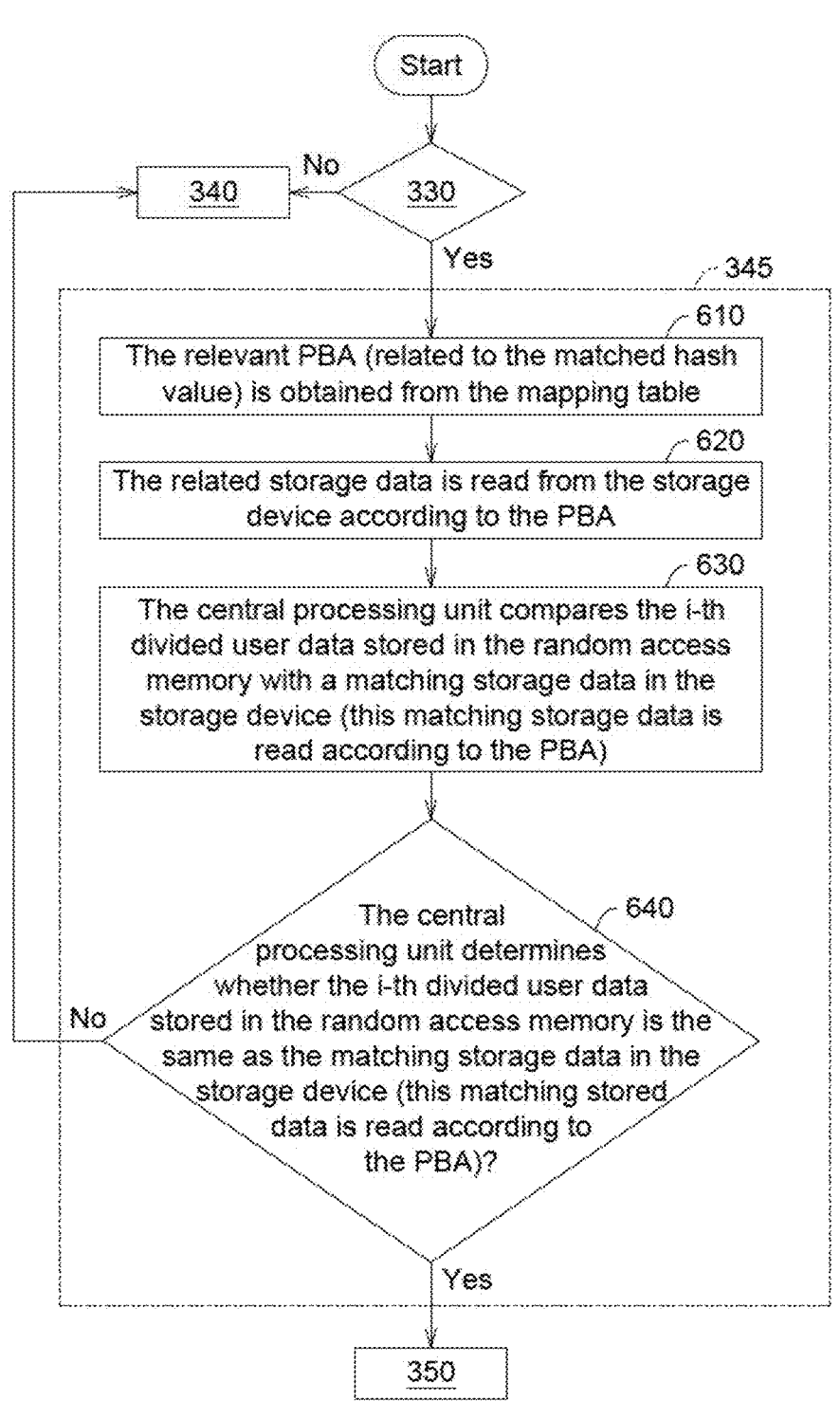
FIG. 6 shows a flow for updating a mapping table according to one embodiment of the application.

FIG. 6 shows a flowchart for updating the mapping table in one embodiment of the present application. As shown in FIG. 6, when step 330 in FIG. 3B is a yes, at step 610, the relevant PBA (related to the matched hash value) is obtained from the mapping table. At step 620, the related storage data is read from the storage device 240 according to the PBA. At step 630, the central processing unit 210 compares the i-th divided user data stored in the random access memory 230 with a matching storage data in the storage device 240 (this matching storage data is read according to the PBA). At step 640, the central processing unit 210 determines whether these two data are the same, i.e., determines whether the i-th divided user data stored in the random access memory 230 is the same as the matching storage data in the storage device 240 (this matching stored data is read according to the PBA). When step 640 is yes, the process continues to step 350. When step 640 is no, the process returns to step 340. Here, "step 640 is no" indicates that the i-th divided user data stored in the random access memory 230 is different from the matching storage data in the storage device 240 (this matching storage data is read according to the PBA), but these two data have the same hash value, this is a hash collision. A hash collision refers that multiple storage data stored in different physical block addresses (PBA) have the same hash value.

Steps 610-640 can be considered as details of step 345.

Figure 7:
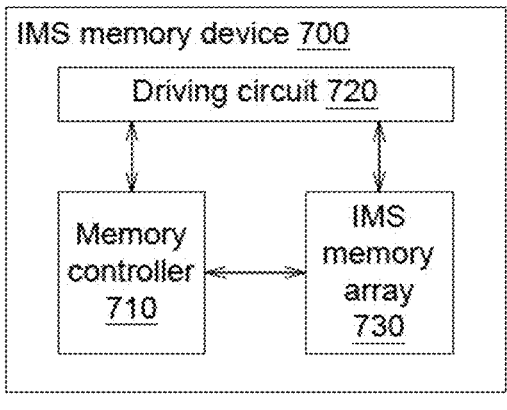
FIG. 7 shows a functional block diagram of a memory device according to one embodiment of the application.

FIG. 7 shows a functional block diagram of a IMS memory device according to one embodiment of the appli-cation. The IMS memory device 700 is coupled to a data controller (for example but not limited by, the CPU in FIG. 2). The IMS memory device 700 is for example the IMS memory device in FIG. 2. The IMS memory device 700 includes: a memory controller 710; a driving circuit 720 coupled to the memory controller; and an IMS memory array 730 coupled to the memory controller, the IMS memory array 730 including a plurality of IMS memory cells. The driving circuit 720 may include a word line driver and/or a bit line driver. Wherein in response to a user data feature of a user data generated by the data controller, the memory controller 710 compares the user data feature of the user data with a plurality of hash values stored in the IMS memory cells of the IMS memory array 730 to generate a comparison result. The memory controller 710 sends the comparison result to the data controller. Based on the comparison result, the data controller determines to write the user data into a storage device or discard the user data.

In one embodiment of the application, the data controller divides the user data into a plurality of divided user data, and the data controller generates a plurality of divided user data features of the plurality of divided user data.

In one embodiment of the application, the memory con-troller 710 compares the plurality of divided user data features of the plurality of divided user data with the plurality of hash values to generate the comparison result.

In one embodiment of the application, when the compari-son result is not matched, the data controller writes the divided user data into the storage device, the memory controller 710 updates the divided user data feature (i.e. hash values) of the divided user data into a hash table of the IMS memory array 730 and the memory controller 710 generates a mapping table under instructions from the data controller (i.e. the CPU 210 in FIG. 2).

In one embodiment of the application, when the compari-son result is matched, the data controller compares the divided user data with a storage data of the storage device.

In one embodiment of the application, when the data controller determines that the divided user data is the same as the storage data of the storage device, the data controller discards the divided user data and the memory controller 710 generates a mapping table under instructions from the data controller (i.e. the CPU 210 in FIG. 2).

In one embodiment of the application, when the data controller determines that the divided user data is not the same as the storage data of the storage device, the data controller writes the divided user data into the storage device, the memory controller 710 updates the divided user data feature of the divided user data into a hash table of the IMS memory array 730 and the memory controller 710 updates a mapping table under instructions from the data controller (i.e. the CPU 210 in FIG. 2).

In one embodiment of the application, the memory device 700 may perform storage methods in FIG. 4A to FIG. 4C and in FIG. 5A to 5C according to an embodiment of the present application.

As shown in FIG. 5C and FIG. 4C, a first part of the same word line stores the hash values (fingerprints) (FP0, FP1, . . . ) and a second part of the same word line store the PBAs (PBA0, PBA1 . . . ). That is, in FIG. 5C and FIG. 4C, the same characteristic value is stored in the same word line in the same block within the same plane.

As shown in FIG. 5C and FIG. 4C, in comparing and searching, once the user data features match one of the hash values stored in the IMS memory device, the corresponding PBA is directly read out immediately without further comparing the PBA. For example, if the hash values FP0 stored in the IMS memory device 700 matches the user data features, then the corresponding physical block address PBA0 is outputted. Still further, the comparison process will apply "don't care" pattern attached to the PBA (i.e. there is no need to compare PBA).

In one example of the application, as shown in FIG. 4A-FIG. 4C, once the hash values stored in the IMS memory device are matched with the user data features, the corresponding memory string will output a large string current. By sensing the memory string currents, the matched result is confirmed.

In one embodiment of the application, details about how PBA related the matched hash values in FIG. 5C is read out are as follows. "Don't care" patterns are applied on physical block address area and fingerprint patterns are applied on the hash area. The physical block address information will be skipped, but the word-line is still selected. The PBA information will be passed to the page buffer, while the hash values stored in the IMS memory device is matched with the user data features (user data hash values). In this case, by this, an unnecessary read on pages can be avoided.

Further, in one embodiment of the application, the timings to implement the data storage method in FIG. 3A and FIG. 3B include inline de-duplication and post de-duplication. Inline de-duplication refers to that when data is written into the storage system, data de-duplication is concurrently performed. Post de-duplication refers to that after data is written into the storage system, data de-duplication is performed.

In one embodiment of the application, the IMS memory device is used to compare whether the hash values of the to-be-written user data is matched with the hash values stored in the IMS memory device. Thus, one embodiment of the application may reduce hash table data movement and also lower storage system power consumption.

In one embodiment of the application, the IMS memory device 220 may be implemented by NOR Flash memory device, which is not to limit the application.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A memory device coupled to a data controller, the memory device including:

a memory controller;

a driving circuit coupled to the memory controller; and a memory array coupled to the memory controller, the memory array including a plurality of memory cells, wherein in response to a first user data feature of a user data generated by the data controller, the memory controller compares the first user data feature with a plurality of second user data features from a plurality of characteristic values stored in the memory cells to generate a comparison result, the plurality of characteristic values including the plurality of second user data features and a plurality of physical block addresses corresponding to data stored in a storage device;

the memory controller sends the comparison result to the data controller;

based on the comparison result, the data controller determines whether to write the user data into the storage device;

the data controller divides the user data into a plurality of divided user data, and the data controller generates a plurality of first user data features of the plurality of divided user data;

the memory controller compares the plurality of first user data features with the plurality of second user data features to generate the comparison result; and in response that the comparison result is matched, the data controller reads out a matched data from the storage device based on the physical block address and compares the divided user data with the matched data.

2. The memory device according to claim 1, wherein when the comparison result is not matched, the data controller writes the divided user data into the storage device, the data controller updates the characteristic values by writing a new characteristic value corresponding to the divided user data in the memory cells.

3. The memory device according to claim 1, wherein when the data controller determines that the divided user data is not the same as the matched data in the storage device, the data controller writes the divided user data into the storage device, the data controller updates the characteristic values by writing a new characteristic value corresponding to the divided user data in the memory cells.

4. The memory device according to claim 1, wherein the second user data feature and physical block addresses belonging to the same characteristic value are stored in the same word lines, different select string lines and different blocks of the memory array.

5. The memory device according to claim 1, wherein the second user data feature and physical block addresses belonging to the same characteristic value are stored in different word lines, the same select string line and the same block of the memory array.

6. The memory device according to claim 1, wherein the second user data feature and physical block addresses belonging to the same characteristic value are stored in the same word line across select string lines of the same block of the memory array.

7. The memory device according to claim 1, wherein the second user data feature and physical block addresses belonging to the same characteristic value are respectively stored in different planes of the memory array.

8. The memory device according to claim 1, wherein the second user data feature and physical block addresses belonging to the same characteristic value are respectively stored in different blocks within the same plane of the memory array.

9. The memory device according to claim 1, wherein the second user data feature and physical block addresses belonging to the same characteristic value are stored in the same block within the same plane of the memory array.

10. The memory device according to claim 9, wherein in comparing and searching, once the user data features match one of the hash values stored in the IMS memory device, the corresponding physical block address is directly read out immediately without further comparing the physical block address.

11. The memory device according to claim 10, where "Don't care" patterns are applied on physical block address area; and fingerprint patterns are applied on the hash area in comparing.

12. A data storage method for a storage system, the data storage method including:

generating a first user data feature of a user data stored in a random access memory by a data controller;

sending the first user data feature of the user data by the data controller to an IMS memory device;

comparing the first user data feature with a plurality of second user data features from a plurality of characteristic values stored in the IMS memory device to generate a comparison result, the plurality of characteristic values including the plurality of second user data features and a plurality of physical block addresses corresponding to data stored in a storage device;

sending the comparison result to the data controller by the IMS memory device; and based on the comparison result, determining whether to write the user data into the storage device by the data controller;

wherein the data controller divides the user data stored in the random access memory into a plurality of divided user data, and the data controller generates a plurality of first user data features of the plurality of divided user data;

wherein the IMS memory device compares the plurality of first user data features with the plurality of second user data features to generate the comparison result; and wherein when the comparison result is matched, the data controller reads out a matched data from the storage device based on a physical block address and compares the divided user data with the matched data.

13. The data storage method according to claim 12, wherein when the comparison result is not matched, the data controller writes the divided user data into the storage device, the data controller updates the characteristic values by writing a new characteristic value corresponding to the divided user data in the IMS memory device.

14. The data storage method according to claim 12, wherein when the data controller determines that the divided user data is not the same as the matched data in the storage device, the data controller writes the divided user data into the storage device, the data controller updates the characteristic values by writing a new characteristic value corresponding to the divided user data in the IMS memory device.

* * * * *